J. COPPUCK.
Smut Machine.
No. 2,066. Patented April 24, 1841.
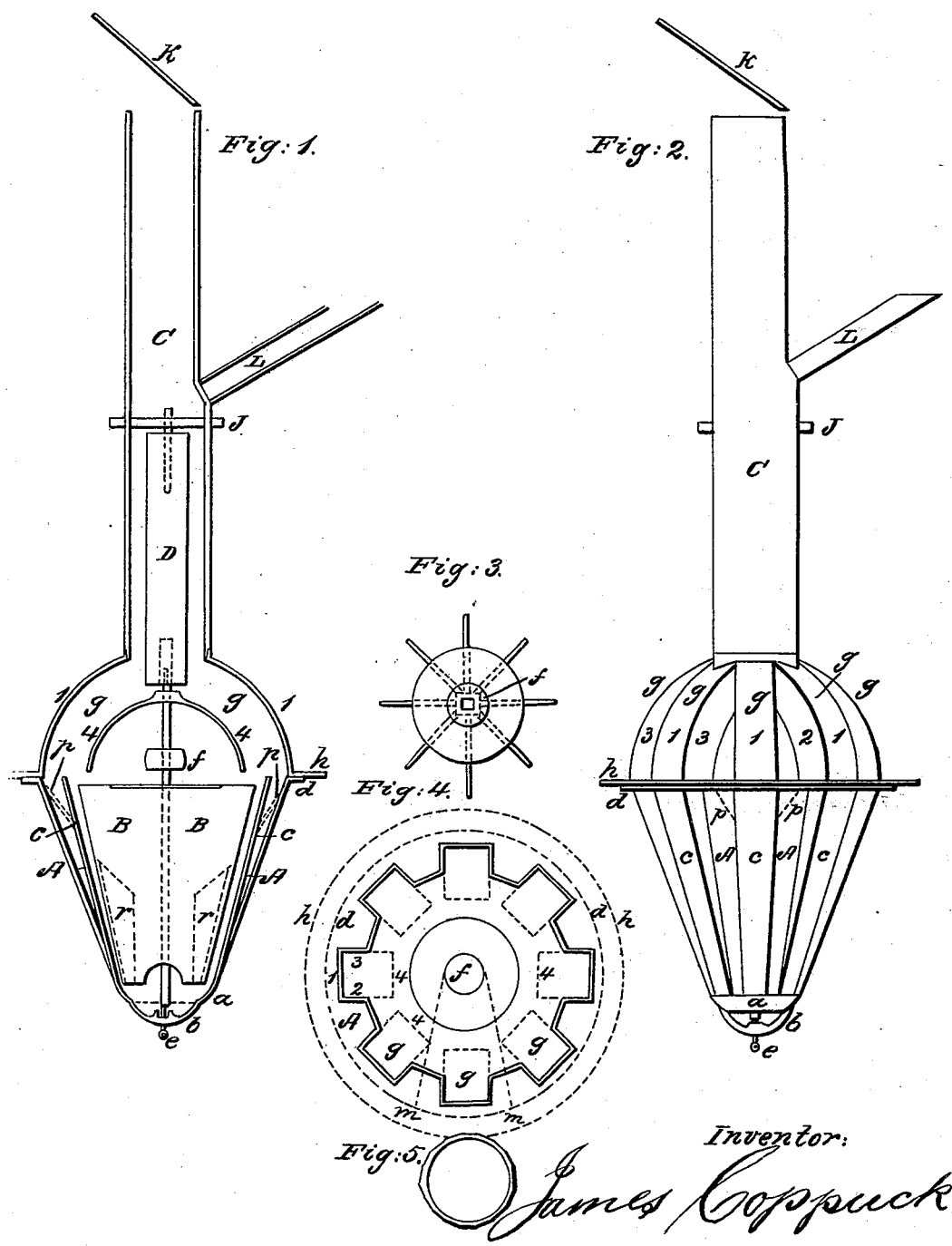

UNITED STATES PATENT OFFICE.

JAMES COPPUCK, OF MOUNT HOLLY, NEW JERSEY.

SMUT-MACHINE.

Specification of Letters Patent No. 2,066, dated April 24, 1841.

*To all whom it may concern:*

Be it known that I, JAMES COPPUCK, of Mount Holly, in the county of Burlington and State of New Jersey, have invented a new and useful Machine for Cleaning Grain from Garlic, Cheat, Smut, Rat-Dirt, Bitter-Weed, and All Light Trash, which I call the "Pneumatic and Percussion Smut-Machine"; and I do hereby declare that the following is a full, clear, and exact description of the construction and operation of the same, reference being had to the annexed drawings, making a part of this specification, in which—

Figure 1 is a longitudinal elevation and section; Fig. 2, a perspective veiw; Fig. 3, a view of the top of the fan or blowing and beating wings; 1, 2, 3, A and $d$ $d$ of Fig. 4, a section or view of the top of the truncated cone and its flutes $c$, $c$, and 1, 2, 5, 4, 6, 3 and $h$, $h$, of Fig. 4, the base of the flues $g$, $g$; and Fig. 5, the bottom of the cylinder or cone where the staves and flutes $c$, $A$ $c$, &c., meet; that part of the drawings painted black represents such parts as are made of iron, the yellow, wood.

These machines may consist of a cylinder or truncated cone with flutes, $c$, A, $c$, Figs. 1 and 2, which I make about 16 inches in diameter at the top (but not confining myself to any particular size,) and 8 to 12 inches in diameter where the staves and flutes terminate, and 16 to 20 inches deep; the lower end of this cylinder or cone is drawn under so as to form a bottomless disk 2, having an opening 6 to 8 inches in diameter, and terminating with a bridge-tree $b$; this cylinder, or truncated cone is formed by alternate staves, A, A, Figs. 1, 2, and 4, and graduated flues or channels, $c$, Figs. 1, and 2, or 1, 2, 3, Fig. 4, being open to the action of the fan, Fig. 3, on the inner surface; these flutes or channels I make 3 inches by 1½ at the top, (where the cylinder is completed with a flange represented by the dotted line $d$, $d$, Fig. 4 and $d$ Figs 1 and 2,) and gradually diminishing in depth until with the staves they terminate as represented in Fig. 5. In this cylinder or truncated cone with flutes I place the flys or wings of a fan B, Fig. 1, approximating to within half an inch of the staves of the cylinder; the shaft of the fan rests and turns upon the steel pointed screw $e$, tapped through the bridge-tree $d$, and on the shaft of the fan there is a pulley $f$, to which the power is applied which imparts motion to the working or moving parts of the machine by means of a belt or cord.

On the top of the cylinder there is a system of flues $g$, $g$, Figs. 1 and 2 or 1, 2, 5, 4, 6, 3 Fig. 4, coresponding in number with the flutes of the cylinder or truncated cone and placed immediately over them, the base of which is completed by the flange $h$, Figs. 1 and 2, represented by the dotted lines $h$, $h$, $n$, $n$, Fig. 4. These flues are cast in two pieces, the inner forming a semicircular bridge-tree, (for the shaft,) and one side of each of the flues, marked 4, Figs. 1 and 4, the outer piece containing three sides of each flue $g$, marked 1 Fig. 1, 2, 3, Fig. 2, and 6, 3, 1, 2, 5, Fig. 4, these flues converge and terminate in one, forming a receptacle for the flue C. This flue C, I make about five feet in the whole length and 6 by 5 inches square above the shaft D, and 6 inches square and 18 or 20 inches long where it contains the shaft D; the top of C is furnished with a valve K. The shaft D is adjusted to the shaft of the fan by a socket gudgeon at its lower end, and supported in the tube by a bridge-tree J receiving the spindle of the upper end; this shaft I make 3 inches in diameter and to extend from the shaft of the fan to the bridge-tree J, say 20 inches.

I contemplate forming the flues $g$, $g$, into one flue, by capping the cylinder with an inverted semispherical dish, dispensing with that part of the flues marked 2, 3, 4, and by making a hollow bridge-tree for the pulley to run in and by bringing the flutes of the cylinder together at its top or flange $d$, as shown by the dotted lines $p$, Figs. 1 and 2. I also contemplate filling up the space between the part of the wings of the fan indicated by the dotted line around $r$, Fig. 1, in such manner that the opening or passage for the air may be of the same capacity between $r$, $r$, as the opening in the bottomless dish $a$. The cylinder or truncated cone, surrounding the fan, may also be constructed with a form or shape resembling a bell, or with any other shape that will produce the effect hereinafter described, and the flutes or channels on its inner surface may be made in a different manner or, they may be entirely omitted.

Many specific forms may be given to this machine without an aberation from the principle. I have constructed several, one of which is a cylinder surrounded by six flues standing some distance from and running the whole length of the cylinder, the whole resting upon a bottomless dish containing a fan; in another I used an air cylinder, (in the place of the flues,) which surrounded the beating cylinder; both of these were finished on the top as the one here described. I have also used this method by diverting the grain after it had been winnowed in a system of tubes forming obtuse angles with each other to a rubber and from the rubber again to the tube; these tubes being connected with a fan immediately under the rubber; these tubes being connected with a fan immediately under the rubber; the fan and the rubber being on the same shaft; but in the machine, which I have here described, I have formed the exterior of a fan by a system of flutes and staves forming a truncated cone and by using the wings of the fan as beats or doffers from which I flatter myself that I have invented a machine, simple in its construction and sure in its operation that warrants better flour from the same grain than any other.

I have contemplated the application of the principle of this machine to the cleaning of rice, by the addition of brushes and proper doffers to the wings of the fan and by making the machine of such materials as are best suited to the purpose.

Operation: The machine or shaft D and wings B B being set in motion, which may be in either direction, by a belt or cord passing between the flues $g$, $g$, and around the pulley $f$ as indicated by the dotted lines $m$, $m$, Fig. 4, a strong blast of air is caused to pass in and up the flutes or channels $c$, $c$, and the flutes $g$, $g$ and C by reason of the centrifugal force of the fan and up through the bottomless dish $a$, and up near the shaft or axle of the fan by inertia; the fan being largest at the top. The grain to be cleaned is let into the tube C through the spout L and falls upon the shaft D causing the grain to strike alternately against the sides of the tube and the periphery of the shaft scattering it in its descent. While the grain is passing through this operation the force of the wind up the tube will float out at the top of C all light trash, as smut-balls, garlic, cheat, drips, white caps, bitter weed, hulls, &c.; should the machine blow out perfect grains, the valve K must be closed until it should blow as desired. The grain after it passes the shaft D is diverted through the different tubes $g$, $g$, into the cylinder or truncated cone $c$ A $c$, where it receives sharp and repeated strokes from the flys or wings of the fan; here the grain by percussion if it be buckwheat is hulled, if it be wheat or rye, the blossom ends, dust, garlic, smut, &c., is switched off and the grain winnowed until it reaches the lower end of the fan or cylinder where it leaves the machine passing out at the opening in the bottomless dish $a$, through a current of wind; the hulls, dust, garlic, smut, &c., passing up with the wind near the axle or shaft of the fan.

What I claim as my invention and desire to secure by Letters Patent is—

The method of constructing the cylinder or truncated cone with flutes, as described in combination with the revolving fan or wings acting as beaters and to produce a current of air through the machine, the whole being constructed and operating substantially in the manner set forth.

JAMES COPPUCK.

Witnesses:
 WILLIAM H. HOLMES,
 A. E. HARKER.